United States Patent [19]

Scott

[11] Patent Number: 5,709,436
[45] Date of Patent: Jan. 20, 1998

[54] ARRANGEMENT FOR CONNECTING A TEST DEVICE TO A RAILROAD CAR BRAKE CONTROL VALVE DEVICE

[75] Inventor: Daniel G. Scott, Pittsburgh, Pa.

[73] Assignee: Westinghouse Air Brake Company, Wilmerding, Pa.

[21] Appl. No.: 767,661

[22] Filed: Dec. 17, 1996

[51] Int. Cl.$^6$ .......................... B60T 11/34; B60T 15/22; B60T 17/22

[52] U.S. Cl. .................. 303/86; 73/39; 73/121; 303/1; 303/28

[58] Field of Search .............. 303/86, 33, 28–30, 303/36–38, 82, 81, 35, 39, 1, 60; 285/63, 137.1, 161, 158; 137/347, 349, 594; 73/121, 126, 39, 37, 127, 128, 129, 863.86, 866.5

[56] References Cited

U.S. PATENT DOCUMENTS

| | | | |
|---|---|---|---|
| 5,451,099 | 9/1995 | Hart et al. | 303/33 |
| 5,480,218 | 1/1996 | Hart et al. | 303/28 |
| 5,503,011 | 4/1996 | Hart et al. | 73/39 |
| 5,509,727 | 4/1996 | Hart et al. | 303/28 |
| 5,559,281 | 9/1996 | McKay et al. | 73/39 |
| 5,634,696 | 6/1997 | Hart et al. | 303/28 |

*Primary Examiner*—Douglas C. Butler
*Attorney, Agent, or Firm*—Gary J. Falce

[57] ABSTRACT

A pneumatic receptacle adapted to receive a pneumatic connector head of a test device is mounted in a universal location remote from the brake control valve of a railroad freight car. The remotely mounted receptacle may be located on the railroad car body, for example, and is communicated with access ports associated with the control valve via hoses or conduits. In locating the receptacle on the car body, hook-up of the test device can be accomplished conveniently and in a safe manner by railroad personnel in the course of conducting a single car test to check the condition of the car brakes, regardless of the control valve location.

6 Claims, 5 Drawing Sheets

ARRANGEMENT FOR CONNECTING A TEST DEVICE TO A RAILROAD CAR BRAKE CONTROL VALVE DEVICE

BACKGROUND OF THE INVENTION

This invention relates generally to the testing of railroad car brakes and more particularly to means for accommodating reception of a tester connecting head at a universally accessible location of the railroad car remote from the car control valve device.

Railroad car freight control valves such as the ABD, ABDW, and ABDX™ control valves typically include a type AB pipe bracket portion having a service portion and an emergency portion mounted on opposite first and second sides or faces of the pipe bracket. Such a typical control valve device, as known in the prior art, is shown in FIG. 1. A third side, the rear of the pipe bracket portion has a number of connections for connecting the pipe bracket portion to pneumatic piping of the freight car. These connections include connections to the brake pipe, the brake cylinder exhaust retaining valve, the brake cylinder, the emergency reservoir, and the auxiliary reservoir. The pipe bracket connection to these pneumatic pipes permits the pipe bracket to provide the necessary communication of pressures to both the service and emergency valve portions. The pipe bracket portion, because it has a service portion and an emergency portion mounted on opposed sides, may physically limit access to portions of the car, and particularly to the various pipe connections at the rear of the control valve device. Thus, tapping into or otherwise measuring the pressure in the fluid lines within the control valve device for test purposes is difficult. One attempting to access the area behind the pipe bracket portion would have to either go around or remove the service portion or the emergency portion. In addition, the removal of a service or emergency portion bolted to the sides of the pipe bracket in order to conduct fluid pressure testing is a difficult and time-consuming process.

One way of accessing fluid under pressure existing within the several control valve passageways without removing any pipe connections at the pipe bracket portion or either the service or emergency portions of the control valve is to provide a special access plate, as covered in U.S. Pat. No. 5,451,099, which is incorporated herein by reference. This access plate is designed to fit between the abutting faces of the pipe bracket and service portion, and includes a plurality of access ports interconnected with internal passages that extend from the pipe bracket face to the service portion face. Respective front, top and bottom access plates are provided having differently oriented access ports to accommodate different locations of the car control valve device.

These access ports are provided primarily to permit an automated single car test device to access air in various passageways of a railroad car control valve. The automated tester has been recently introduced to the railroad industry as a replacement for the present industry standard manual single car test device, and is covered by U.S. Pat. No. 5,509,727, which is incorporated herein by reference. The access ports are normally closed by means of one-way check valves associated with the respective access ports to prevent the escape of air therefrom. A receiver module is typically secured to the pipe bracket at the access port location to house these check valves. The automatic tester includes a pneumatic connector head by means of which the test device may be hooked-up to the receiver module when it is desired to access air within the control valve passageways for analyzing by the automatic test device. The test connector head includes means for opening the normally closed check valves when affixed to the receiver module, such as disclosed in U.S. Pat. Nos. 5,503,011 and 5,559,281, which are incorporated herein by reference.

In addition to housing the access port check valves, the receiver module provides an access port connecting face that extends beyond the dimensional bounds of the control valve. Extending the access port location in this manner, combined with the fact that various style access plates may be provided to accommodate top, front, and bottom access orientation of the access ports, is intended to facilitate hook-up of the tester. Nevertheless, difficulty in making the actual connection of the automatic tester with the receiver module can still be encountered due to the various remote locations where the car control valve is mounted on different style cars. Typically, such locations are physically difficult to reach, being underneath flat cars and box cars, for example, and under the slope sheet on hopper cars. Even on cars having an open end compartment, a trainman is required to climb aboard the car to reach the control valve.

SUMMARY OF THE INVENTION

The object of the present invention is to provide a universal access arrangement for pneumatically connecting a test device or the like to the control valve of a railroad car irrespective of the control valve location and/or orientation.

In carrying out this objective, there is provided a pneumatic receptacle at a location of the railroad car that is convenient for railroad personnel to access in the course of hooking up an automated tester to conduct a single car test. The receptacle is provided with channels that are connected at one end to the access ports associated with the car control valve device by appropriate conduits to accommodate location of the receptacle remote from the control valve. These channels extend through the receptacle and have spring-loaded check valves that are normally seated to prevent the escape of fluid pressure from the control valve access ports when the automated tester is not hooked up. A pneumatic connector head of the automated tester is adapted to be plugged into the receptacle when it is desired to conduct a single car test, the connector head being adapted to unseat the check valves within the receptacle channels when plugged in, such that fluid pressure within the car control valve is conveyed to the automated tester.

BRIEF DESCRIPTION OF THE DRAWINGS

This and other attendant objects and advantages of the present invention will become apparent from the following more detailed explanation when taken in conjunction with the accompanying drawings in which.

DESCRIPTION AND OPERATION

Figure 2:
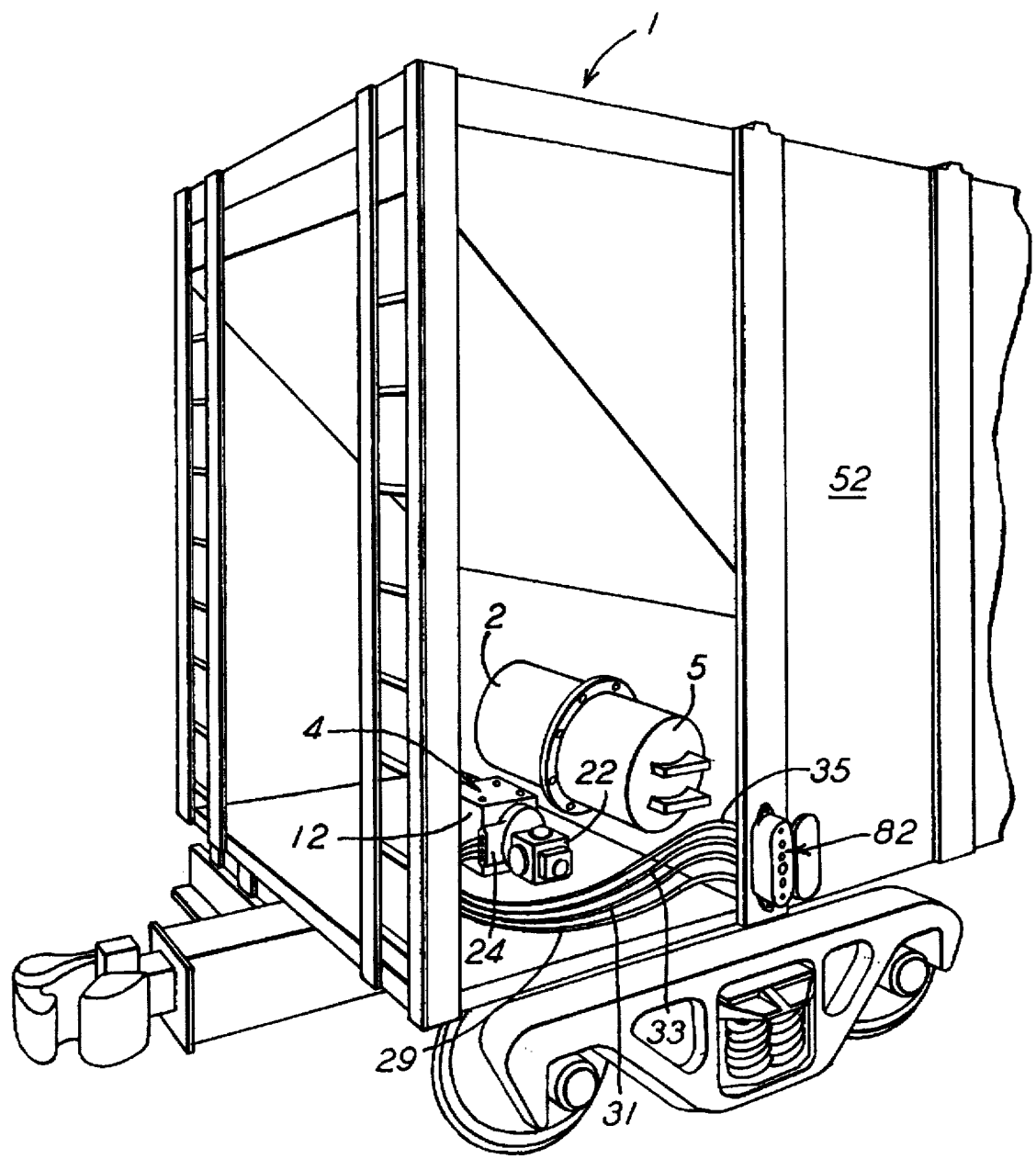
FIG. 2 is a perspective view of a railroad freight car illustrating a remote access arrangement via which an automated tester may be hooked-up to the railroad car to conduct a single car test.

Referring to FIG. 2, there is shown a railroad freight car 1 having a platform on which is mounted an AB type control valve device 4, and a combined auxiliary reservoir 5 and emergency reservoir 2. Control valve device 4 includes a pipe bracket portion 12 having a service portion 22 mounted on one side and an emergency portion (not shown) mounted on the opposite side. Another side of pipe bracket portion 12 is provided with openings to which the car brake cylinder 3 (not shown), brake pipe 1 (not shown), auxiliary reservoir 5 and emergency reservoir 2 are connected, respectively, as by conventional piping. As is well known in the railroad industry, pipe bracket 12 is provided to permit removal of service portion 22 and/or the emergency portion without disturbing the afore-mentioned pipe connections.

Figure 3:
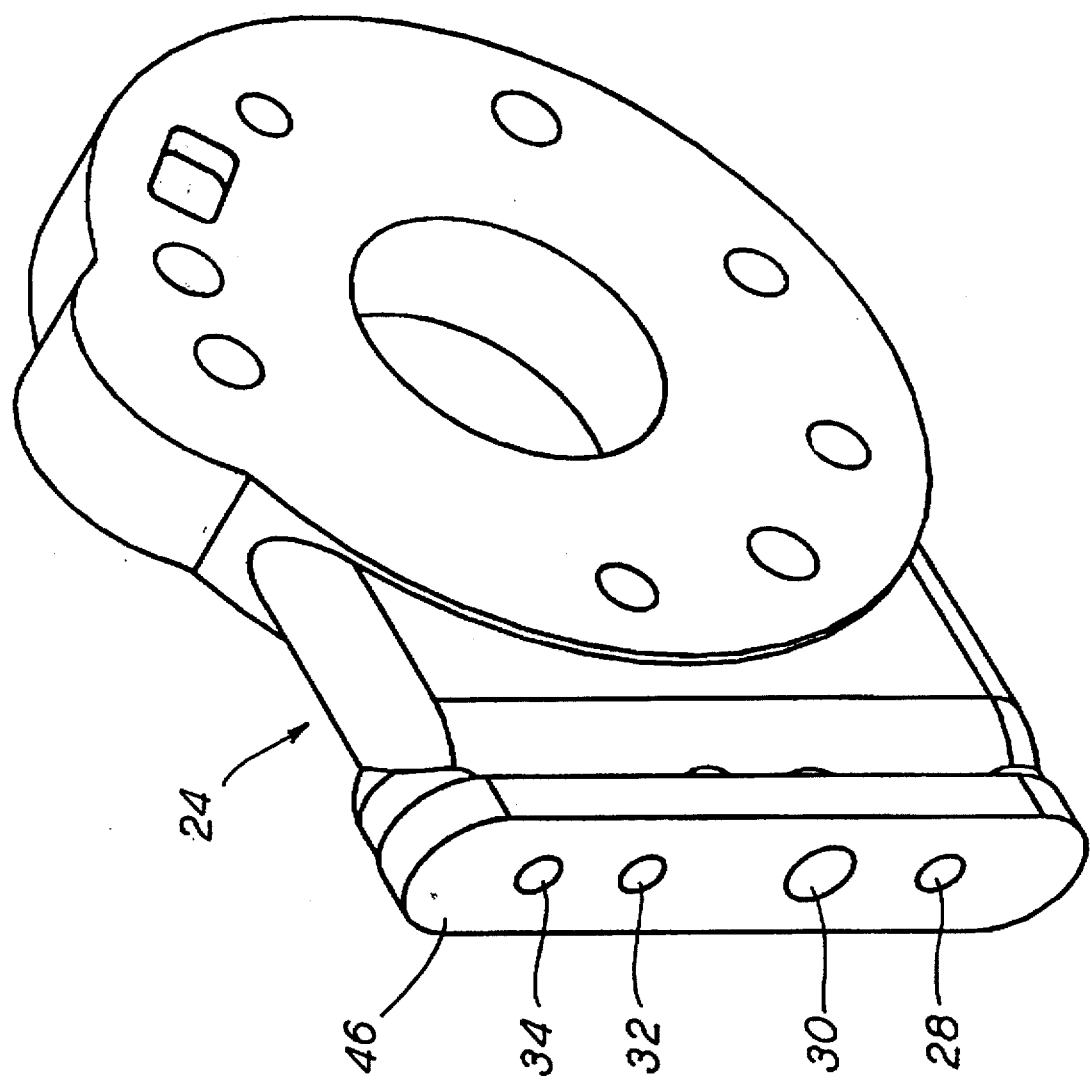
FIG. 3 is an axonometric view of a known access plate with which a conventional AB type control valve device may be modified to provide access ports via which fluid under pressure may be conveyed to an automated tester.

Sandwiched between pipe bracket portion 12 and service portion 22 is an access plate 24. As shown in FIG. 3, access plate 24 has a front oriented face 46 in which a plurality of access ports 28, 30, 32, and 34 are provided. It will be understood that access plate 24 has internal passages that communicate access ports 28, 30, 32, and 34 with internal passages in pipe bracket 12 and thus with the respective pipes leading to brake cylinder 3, brake pipe 1, auxiliary reservoir 5, and emergency reservoir 2.

While an access plate 24 having front oriented access ports 28, 30, 32, 34 has been shown in the present example consistent with the mounting location of control valve device 4, access plates having either top or bottom oriented access ports may also be employed, depending upon the control valve location and position, without departing from the invention. The afore-mentioned U.S. Pat. No. 5,451,099 shows these various access plates.

In addition, access ports may be provided directly in the pipe bracket portion itself, as covered in U.S. Pat. No. 5,634,696 relating to the new style AB pipe bracket, and as covered in U.S. Pat. No. 5,480,218 relating to the new single-sided pipe bracket, also deemed to be within the scope of the present invention.

Figure 1:
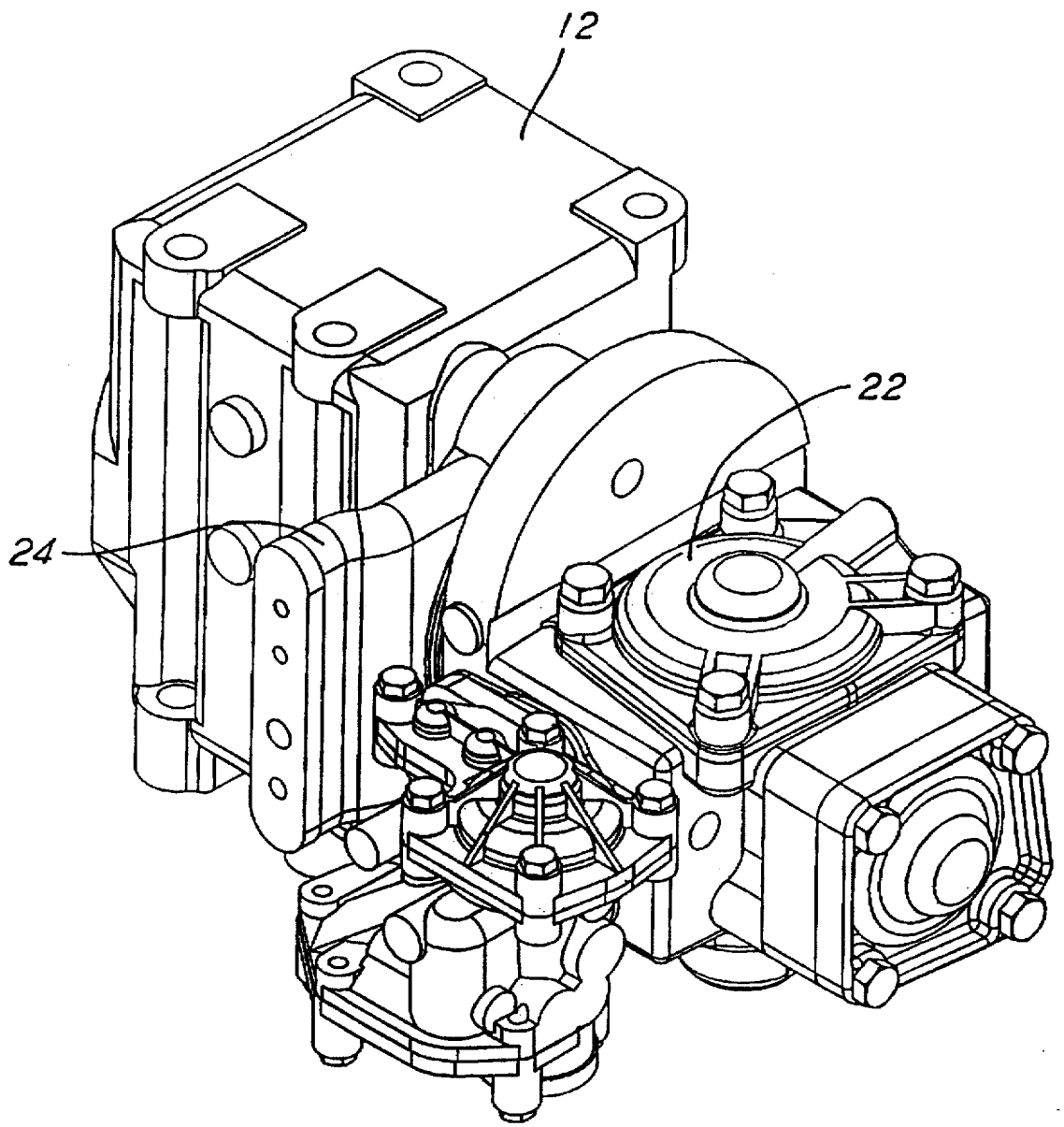
FIG. 1 is an axonometric view of a railroad freight car control valve device, as known in the prior art.

Fitted to each of the respective access ports 28, 30, 32, and 34 is one end of a conduit 29, 31, 33, and 35, such as a hose, tube or the like that extends to a pneumatic receptacle 82 which is remote from the control valve device 4. Receptacle 82 is mounted, as by screws 83, (FIG. 4) to railroad car 1 at a location conveniently accessible to railroad personnel assigned the task of checking the car brakes using the afore-mentioned automated single car tester recently introduced to the railroad industry. Such a convenient location may be on the side of the car body 52, as shown in FIG. 1, or, alternatively, on the body underframe or truck sideframe.

Figure 4:
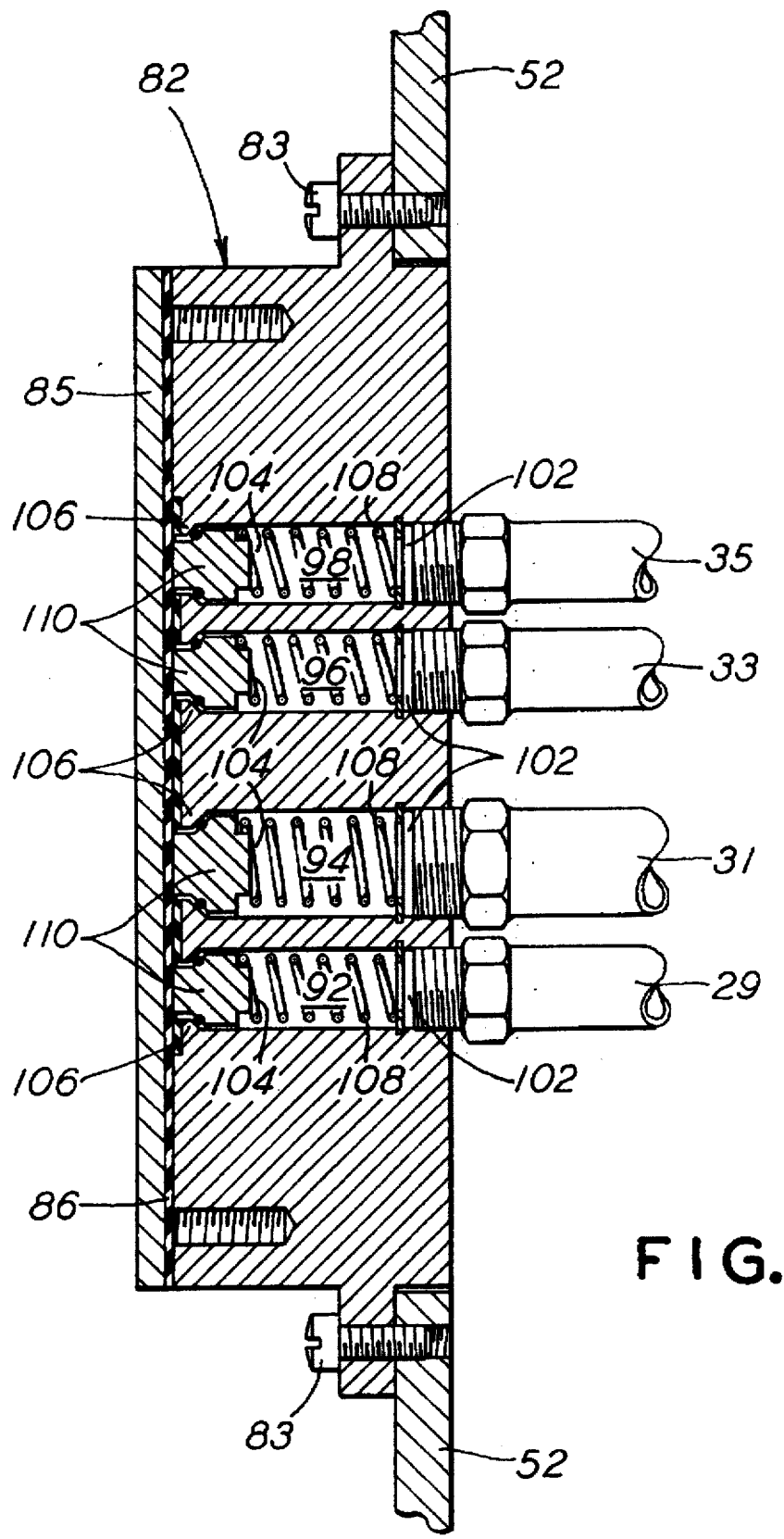
FIG. 4 is an enlarged, vertical section view of the receptacle of FIG. 2 showing a manner of mounting on a railroad car body remote from the control valve to facilitate reception of the pneumatic connector head of an automated tester.
Figure 5:
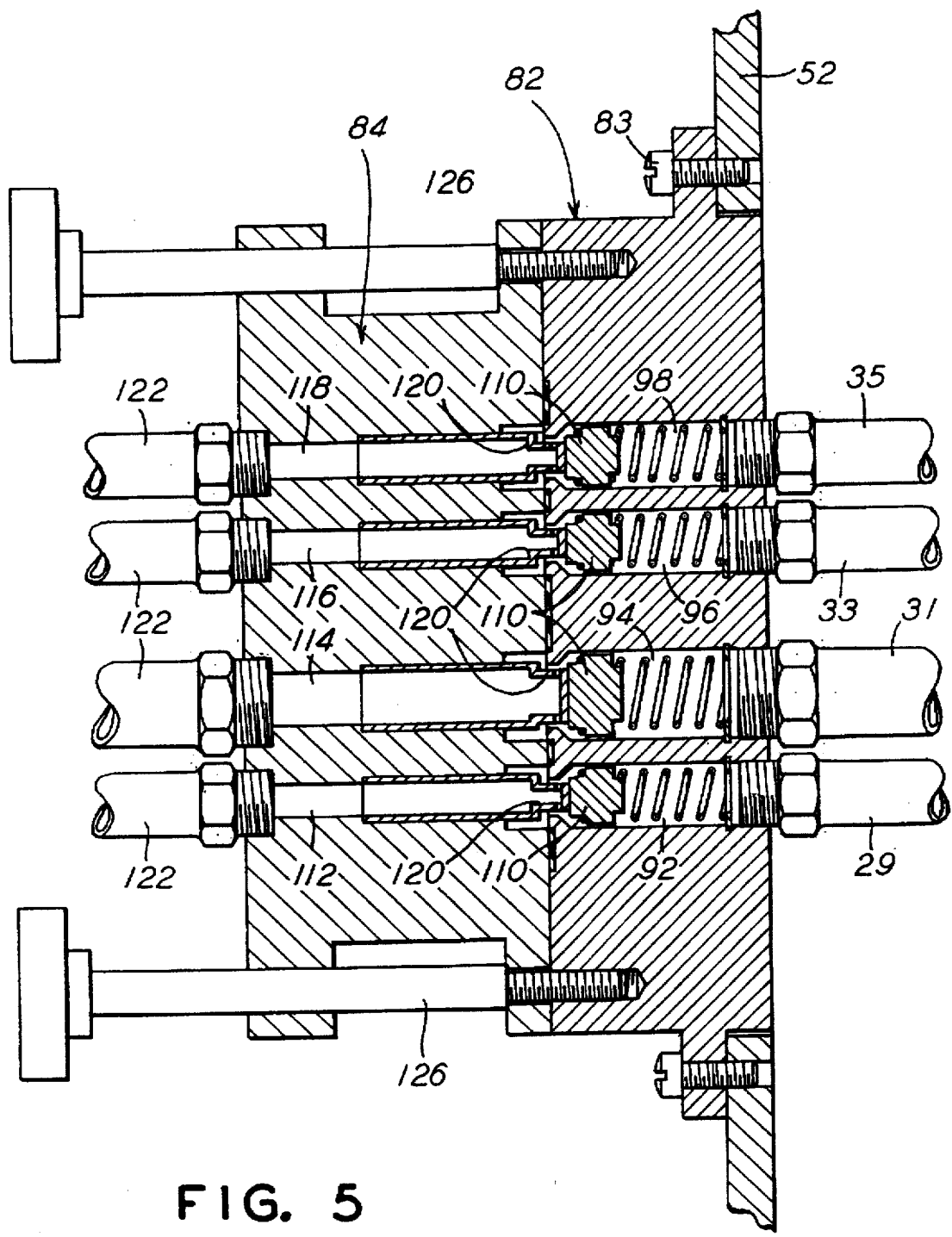
FIG. 5 is a similar view as shown in FIG. 4, but showing the pneumatic connector head affixed to the receptacle.

Each of the respective conduits 29, 31, 33, and 35 is fitted at its other end to a channel 92, 94, 96, and 98 of receptacle 82, as shown in FIGS. 4 and 5. Each end 102 of channels 92, 94, 96 and 98 in receptacle 82 is thus in fluid pressure communication with brake cylinder 3, brake pipe 1, auxiliary reservoir 5 and emergency reservoir 2, respectively. At an opposite or receiving end 104 of channels 92, 94, 96 and 98 is formed a valve seat 106 with which a check valve member 110 is cooperatively arranged. A spring 108 urges valve element 110 toward engagement with valve seat 106 to normally prevent the escape of fluid pressure from the receiving end of channels 92, 94, 96 and 98. A cover 85, which may be hinged or otherwise affixed to receptacle 82, is provided to prevent entry of dirt and other foreign matter to receiving end 104 of channels 92, 94, 96 and 98, such cover having a detent or other latching arrangement (not shown) to normally secure the cover in a closed position. This cover could also provide a redundant pressure seal.

When it is desired to check the operating condition of the brakes of railroad car 1 using an automated single car tester, cover 85 is opened or removed and a pneumatic connector head 84 of the automated tester is plugged into receptacle 82, as shown in FIG. 5. The connecting head 84 is connected to receptacle 82 by any convenient means such as by handle operated screws 126. Connector head 84 has channels 112, 114, 116, 118 provided therethrough. The connector head channels are each bounded at one end by a respective projecting member 120, which projects from the end of the connector head 84 that is engaged with receptacle 82. At the opposite end of the connector head, channels 112, 114, 116, 118 are each bounded by a respective fitting 122, which is adapted to receive a hose to convey fluid under pressure to the single car tester (not shown). Channels 112, 114, 116, 118 are located in connector head 84 such that when the connector head 84 is plugged into receptacle 82, each channel 112, 114, 116, 118 is aligned with each respective housing channel 92, 94, 96, 98. Each of the projecting members 120 is sized and configured to fit inside each respective receiving chamber 104 of the receptacle channels 92, 94, 96, 98.

When each projecting member 120 is inserted within its respective receiving chamber 104 of the respective channels 92, 94, 96, 98, each projecting member 120 contacts a respective check valve member 110. As the projecting members 120 are inserted fully within each receiving chamber 104, the projecting members 120 push each check valve member 110 against the spring bias force acting thereon and move the check valve member 110 back away from its respective valve seat 106 into an "open" position. The projecting members 120 are sized and configured so that, when they are inserted within the receiving chambers 104, fluid may enter a central passage therein and flow into the respective connector head channels 112, 114, 116, 118. In the open position of check valve member 110, fluid under pressure may thus travel from the pipe bracket and access plate internal passageways, through the respective access ports 28, 30, 32, 34, through conduits 29, 31, 33, 35, through respective receptacle channels 92, 94, 96, 98, and the respective connector head channels 112, 114, 116, 118 to the connector head fittings 122 from where the fluid pressure is conveyed to an automated single car tester for monitoring in the course of conducting the single car test.

When the connector head 84 is separated from the access housing 82 following completion of the single car test, each projecting member 120 of connector head 84 is retracted from its corresponding receiving chamber 104 of receptacle 82, allowing springs 108 to force check valve members 110 to a closed position against their respective valve seats 106. Thus, when the connector head 84 is unplugged from receptacle 82, fluid under pressure is contained within the afore-mentioned fluid channels in receptacle 82 without leakage.

Following removal of connector head 84, cover 85 of receptacle 82 is closed and tightly latched in place to prevent the entry of dirt, moisture and other foreign matter to receptacle 82. Prevention of such contamination can be better assured by providing cover 85 with a sealing gasket 86.

It will now be appreciated, in accordance with the foregoing invention, that fluid pressure within control valve device 1 may be easily and quickly accessed from a convenient car location remote from the control valve device for analyzation by an automated single car tester in conducting a single car test to determine the general condition of railroad car brakes, without requiring a trainman or other railroad personnel to climb onto, over, or around the car.

I claim:

1. For a railroad car having a brake pipe, an auxiliary reservoir, an emergency reservoir, a brake cylinder, and a control valve device, including a pipe bracket portion, to which the foregoing are connected, there is provided a universal access arrangement via which a pneumatic connector head of a test device may be connected to the control valve device to test the railroad car brakes, said universal access arrangement comprising:
   (a) said control valve device having at least one access port and a corresponding passageway interconnected with a respective one of said brake pipe, said auxiliary reservoir, said emergency reservoir, and said brake cylinder device;
   (b) pneumatic receptacle means affixed to said railroad car remote from said control valve device for receiving said pneumatic connector head of said test device; and
   (c) conduit means between said at least one access port and said pneumatic receptacle means for establishing fluid pressure communication between said corresponding passageway of said control valve device and said test device without interrupting any one of said brake pipe, auxiliary reservoir, emergency reservoir, and brake cylinder connections with said pipe bracket portion of said control valve device.

2. Universal access arrangement as recited in claim 1, wherein said control valve device further includes an access plate interposed between said service portion and said pipe bracket portion and having said at least one access port.

3. Universal access arrangement as recited in claim 1, wherein said pneumatic receptacle means comprises:
   (a) at least one through channel having a first end connected to said conduit means and a second end to which said pneumatic connector head is connectable; and
   (b) a check valve disposed in said at least one through channel such as to prevent flow of fluid under pressure in a direction from said at least one access port to said second end of said at least one through channel in a closed condition thereof.

4. Universal access arrangement as recited in claim 3, further comprising spring bias means acting on said check valve in a direction to established said closed condition thereof.

5. Universal access arrangement as recited in claim 3, wherein said receptacle means further include means for covering said at least one through channel at said second end thereof when said pneumatic connector head is disconnected from said receptacle means.

6. Universal access arrangement as recited in claim 5, wherein said means for covering said receptacle include:
   (a) a cover plate connected to said receptacle means in a manner to establish and interrupt access to said second end of said at least one through channel; and
   (b) a sealing gasket between said cover plate and said second end of said at least one through channel when such access thereto is interrupted by said cover plate.

* * * * *